United States Patent
Bogensberger et al.

[19]

[11] Patent Number: 6,016,121
[45] Date of Patent: Jan. 18, 2000

[54] MULTIPLE FREQUENCY GPS RECEIVE OPERATION USING SINGLE FREQUENCY SEQUENCING

[75] Inventors: Erik F. Bogensberger; Matthew L. Burns; Jeffery C. Rambo, all of Cedar Rapids, Iowa

[73] Assignee: Rockwell Collins, Inc., Cedar Rapids, Iowa

[21] Appl. No.: 09/169,623

[22] Filed: Oct. 9, 1998

[51] Int. Cl.⁷ .................................................. G01S 5/03
[52] U.S. Cl. ................................................ 342/357.12
[58] Field of Search ................ 342/357.12, 357.06; 701/213

[56] References Cited

U.S. PATENT DOCUMENTS

| | | | |
|---|---|---|---|
| 5,592,173 | 1/1997 | Lau et al. | 342/357.12 |
| 5,650,785 | 7/1997 | Rodal | 342/357.12 |
| 5,663,734 | 9/1997 | Krasner | 342/357.12 |
| 5,678,169 | 10/1997 | Turney | 342/357 |

Primary Examiner—Gregory C. Issing
Attorney, Agent, or Firm—Kyle Eppele; James P. O'Shaughnessy

[57] ABSTRACT

Disclosed are dual frequency GPS receivers using single frequency sequencing and methods of using the same to track both first global positioning signals at a first frequency and second global positioning signals at a second frequency. Both of the first global positioning signals and the second global positioning signals are received with a multi-frequency antenna or multiple antennas of different frequencies. The first global positioning signals and the second global positioning signals are separated and converted into first and second translated global positioning signals, respectively, having an intermediate frequency or frequencies. Frequency sequencing is controlled to selectively alternately couple the first and second translated global positioning signals one at a time to the channels of the digital signal processor for use in navigation solution determination.

12 Claims, 5 Drawing Sheets

MULTIPLE FREQUENCY GPS RECEIVE OPERATION USING SINGLE FREQUENCY SEQUENCING

FIELD OF THE INVENTION

The present invention relates generally to dual frequency global positioning system (GPS) receivers. More particularly, the present invention relates to dual frequency GPS receivers using single frequency switching techniques, and methods of operating the same.

BACKGROUND OF THE INVENTION

Global navigational satellite systems (GNSS) are known and include the global positioning system (GPS) and the Russian global orbiting navigational satellite system (GLONASS). GNSS-based navigational systems are used for navigation and positioning applications. In the GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency f1 of 1575.42 MHz, and an L2 signal having a frequency f2 of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

GPS navigational systems determine positions by timing how long it takes the coded radio GPS positioning signal to reach the receiver from a particular satellite (e.g., the travel time). The receiver generates a set of codes identical to those codes (e.g., the Y-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver. By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. The GPS signals also include a 50 bit per second data stream or data message which is superimposed on the C/A and Y-codes. Once the receiver has matched its code to the code in the GPS signal from a particular satellite, the receiver can decipher the data message.

GPS receivers having multiple radio frequency (RF) capabilities (i.e., the ability to utilize both L1 and L2 positioning signals) can measure ionospheric delays and can provide alternate frequencies to track in the event of frequency interference. In the prior art, multiple RF receivers have performed the ionospheric delay measurements and responded to frequency interference by using multiple frequency inputs to the digital signal processor channels to simultaneously process the L1 positioning signals and the L2 positioning signals. However, it is advantageous to reduce receiver circuitry by providing only one frequency input at a time, or to reduce power consumption by applying power to only one frequency input at a time.

SUMMARY OF THE INVENTION

Disclosed are dual frequency GPS receivers using single frequency switching and methods of using the same to track both first global positioning signals at a first frequency and second global positioning signals at a second frequency, Both of the first global positioning signals and the second global positioning signals are received with a multi-frequency antenna or multiple antennas with different frequencies. The first global positioning signals and the second global positioning signals are separated and converted into first and second translated global positioning signals, respectively, having an intermediate frequency or frequencies. Frequency switching is controlled to selectively alternately couple the first and second translated global positioning signals one at a time to the channels of the digital signal processor for use in navigation solution determination.

DETAILED DESCRIPTION OF THE PREFERRED EMBODIMENTS

Figure 1:
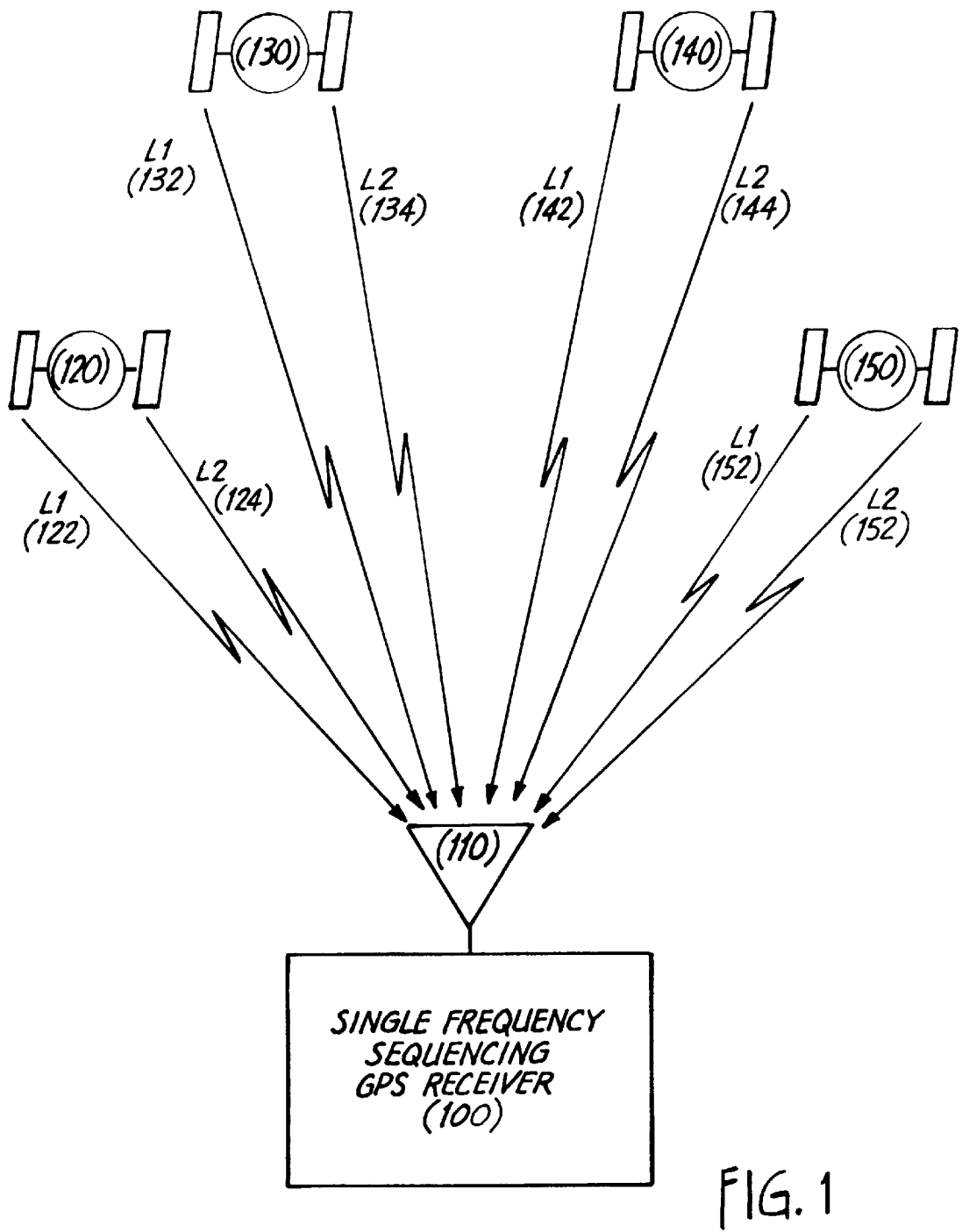
FIG. 1 is a block diagram illustrating a single frequency sequencing GPS receiver operating in accordance with the present invention.

FIG. 1 is a block diagram of single frequency sequencing GPS receiver 100 operating in an environment in which it receives at antenna 110 both L1 and L2 global positioning signals from multiple satellites. As illustrated, satellite 120 transmits L1 positioning signal 122 and L2 positioning signal 124. Satellite 130 transmits L1 positioning signal 132 and L2 positioning signal 134. Satellite 140 transmits L1 positioning signal 142 and L2 positioning signal 144. Satellite 150 transmits L1 positioning signal 152 and L2 positioning signal 154. Typically, positioning signals from other "visible" GPS satellites will also be received by antenna 110 of receiver 100. To generate a navigation solution, receiver 100 must receive positioning signals from at least four GPS satellites. Single frequency sequencing GPS receiver 100 implements control logic and methods of the present invention in order to maintain optimum receiver performance while periodically cycling frequencies to measure ionospheric delays, and to coordinate switching of frequencies for optimal recovery from frequency interference.

Figure 2:
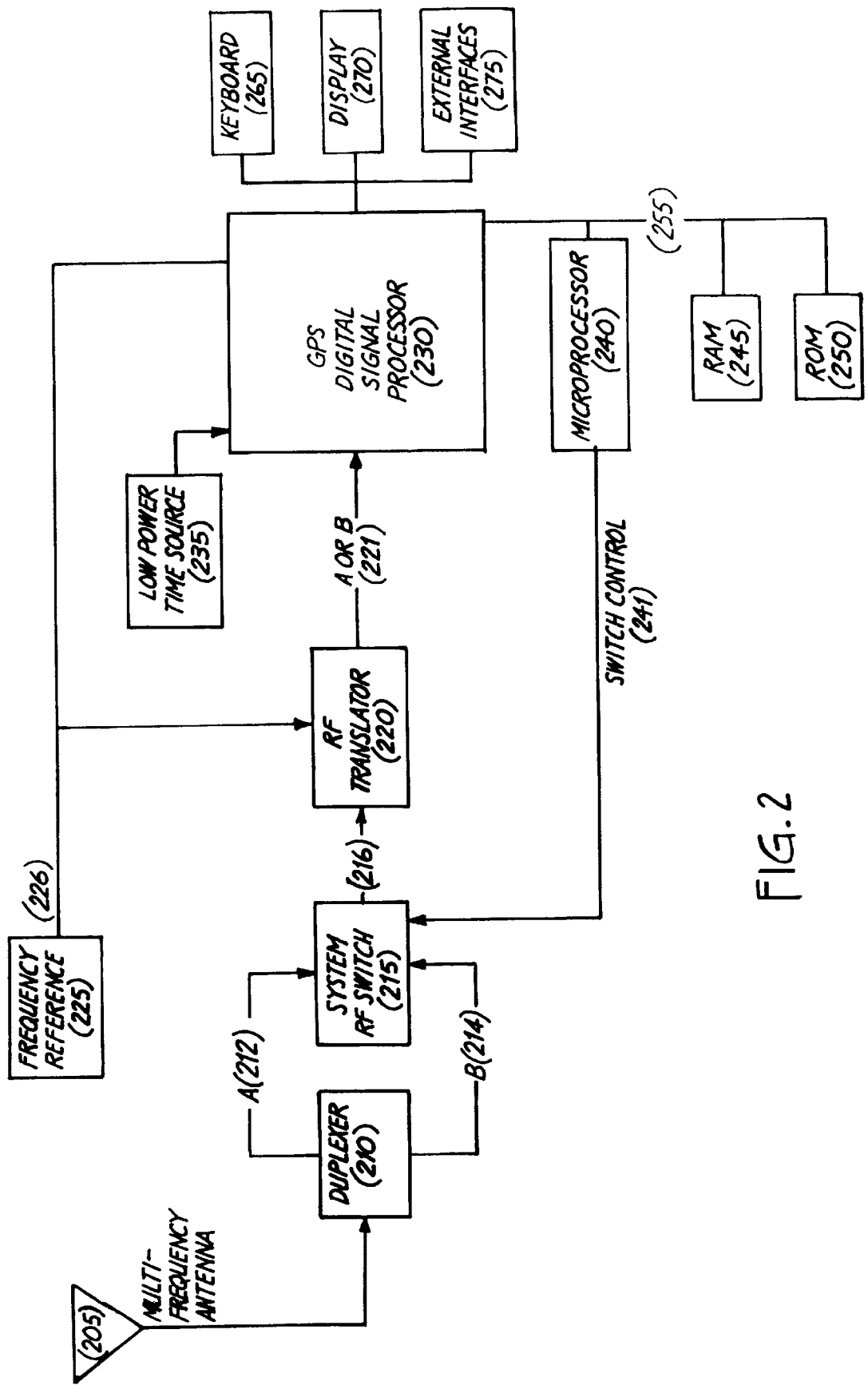
FIG. 2 is a block diagram illustrating a first more detailed embodiment of the single frequency sequencing GPS receiver shown in FIG. 1, using a system frequency switch.

FIG. 2 is a block diagram illustrating single switchable RF input GPS receiver 200, which is a first embodiment of GPS receiver 100 illustrated in FIG. 1. Receiver 200 includes multi-frequency antenna 205, diplexer 210, system RF switch 215, RF translator 220, reference frequency generator 225, digital signal processor (DSP) 230, low power time source 235, microprocessor 240, random access memory (RAM) 245, read only memory (ROM) 250, data bus 255, keyboard 265, display 270 and external interface 275.

Antenna 205 is a multi-frequency antenna adapted to receive global positioning signals from multiple satellites at multiple frequencies. Preferably, antenna 205 is adapted to receive GPS positioning signals at the L1 and L2 frequencies. Diplexer 210 receives the signals from antenna 205, and separates the signals into L1 signals 212 and L2 signals 214. System RF switch 215 receives L1 signals 212 and L2 signals 214. Under the control of microprocessor 240 via input 241, switch 215 provides at output 216 a selected one of signals 212 an 214. The selected one of L1 signals 212 and L2 signals 214 are provided to RF translator circuitry 220.

Using a reference frequency signal 226 provided by frequency reference generator 225, RF translator 220 shifts the selected one of the L1 and L2 frequency signals to an intermediate frequency signal 221. Signal 221 provides the input to all of the correlation channels of the DSP 230. In the case of GPS, output 221 of RF translator circuit 220 contains a composite of all the spread spectrum pseudorandom noise (PRN) coded signals received in the L1 or L2 frequency bands, depending upon which of signals 212 and 214 are connected to translator 220 by switch 215. Under the control of microprocessor 240 via data bus 255, each channel of DSP 230 generates a local replica of a particular PRN signal. A signal is being "tracked" when the locally generated signal is matched both in frequency and phase with an incoming PRN signal.

In preferred embodiments, microprocessor 240 implements the switch control logic or methods of the present invention, and controls the operation of DSP 230. RAM 245 and/or ROM 250 connected to bus 255 can be used to store data for use by microprocessor 240 in implementing the methods of the present invention. Keyboard 265 represents one possible user input device for controlling or providing instructions to receiver 200. Display device 270 and external interfaces 275 represent possible human and machine interface devices which allow receiver 200 to communicate information to a user or host system. Any of keyboard 265, display 270 and external interfaces 275 can be eliminated or replaced with other input/output devices if desired.

Figure 3:
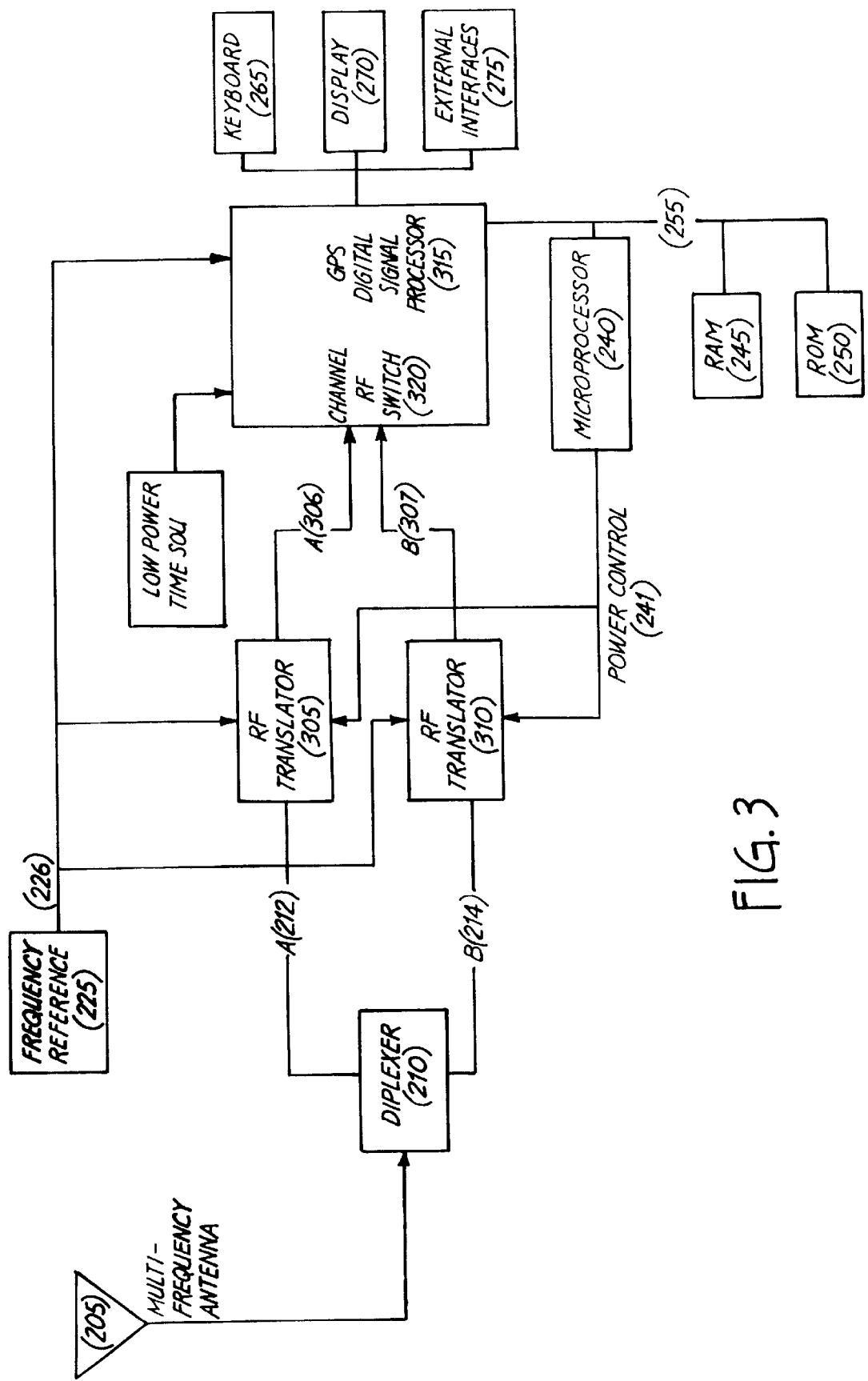
FIG. 3 is a block diagram illustrating a second more detailed embodiment of the single frequency sequencing GPS receiver shown in FIG. 1, using coordinated RF power control and channel frequency switching.

FIG. 3 is a block diagram illustrating a dual RF input GPS receiver 300 using a single frequency sequencing technique, which is a second embodiment of GPS receiver 100 illustrated in FIG. 1. Receiver 300 is similar to receiver 200 illustrated in FIG. 2, except that both frequency inputs are provided to the GPS digital signal processor 315. This is accomplished by including two separate RF translators 305 and 310, each receiving a different one of L1 positioning signals 212 and L2 positioning signals 214. The outputs 306 and 311 of translators 305 and 310 are versions of the L1 and L2 positioning signals, respectively, converted to an intermediate frequency or frequencies. As noted above, both of the intermediate frequency converted or translated L1 signals 306 and the intermediate frequency converted or translated L2 signals 311 are provided to DSP 315. Under the control of microprocessor 240 via power control line 241, the power consumption of the receiver is reduced by only applying power to one of the RF translator circuits at a time.

Control of the frequency to be acquired and tracked is performed by each individual channel within the signal processor. Channel RF switch 320, which resides within DSP 315, is used to provide the frequency selection under the control of microprocessor 240. Thus, receiver 300 utilizes a switching function and associated control methodology which are substantially the same as used by receiver 200, but with the switching function implemented within the DSP. A key element of this invention on a multiple frequency input architecture is the coordination of the switch in frequency and power control of the RF translators. That is, all of the signal processor channels change frequency simultaneously coordinated with the power sequencing of the RF translator circuits.

Figure 4:
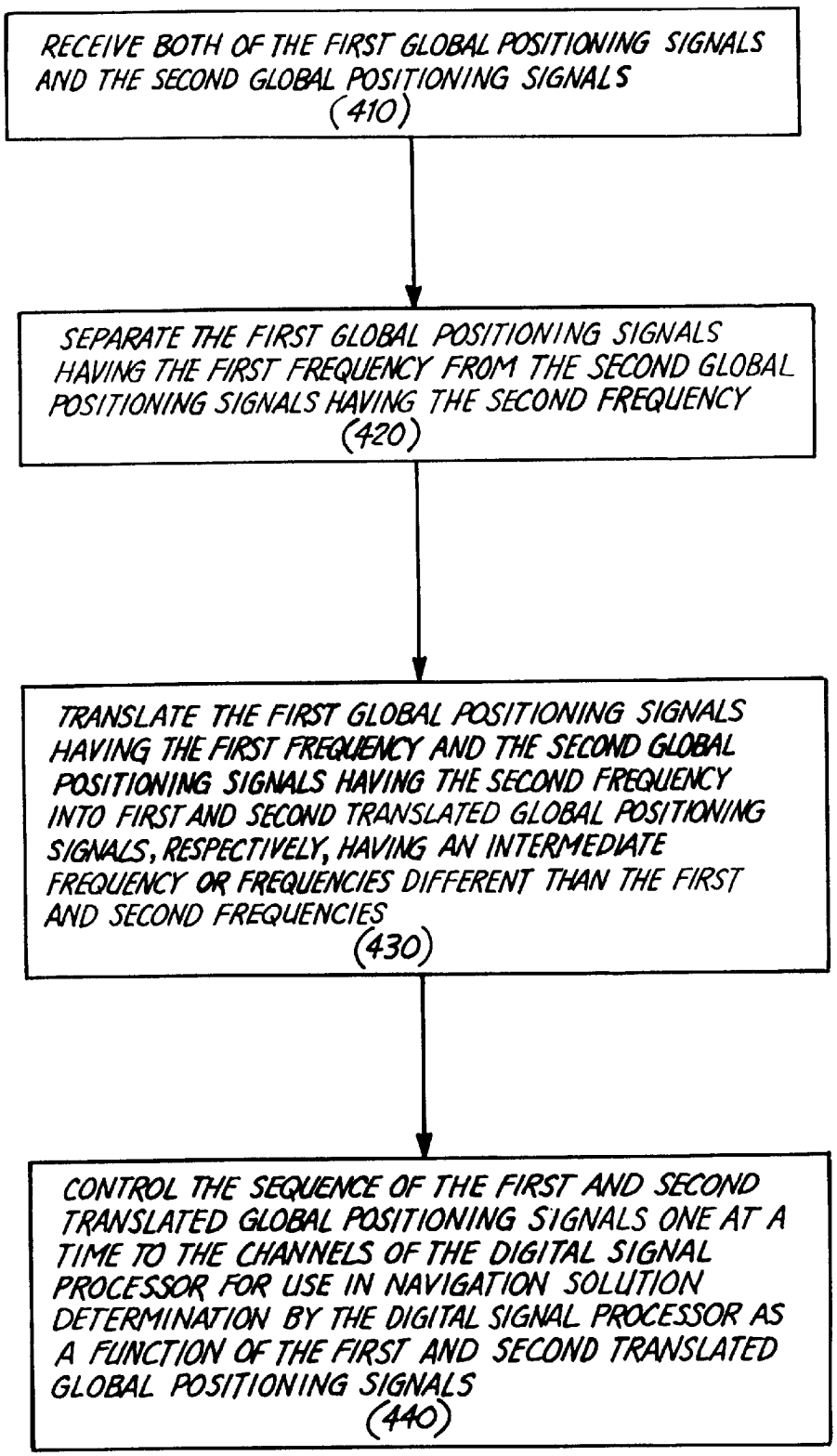
FIG. 4 is a block diagram illustrating a method of operating the single frequency sequencing GPS receivers of the present invention.

A first method of tracking both first global positioning signals at a first frequency (L1) and second global positioning signals at a second frequency (L2) using a GPS receiver having a single frequency input is illustrated in the flow diagram of FIG. 4. As illustrated, the method includes the following steps. First, as shown at block 410, both of the first global positioning signals and the second global positioning signals are received. Next, as illustrated at block 420, the first global positioning signals having the first frequency are separated from the second global positioning signals having the second frequency. Then, as illustrated at block 430, the first global positioning signals having the first frequency and the second global positioning signals having the second frequency are translated into first and second translated global positioning signals, respectively, having an intermediate frequency or frequencies different than the first (L1) and second (L2) frequencies. Finally, as shown at block 440, the sequencing of the frequencies is controlled to selectively alternately couple the first and second translated global positioning signals one at a time to the channels of the digital signal processor for use in navigation solution determination.

The present invention includes frequency selection logic or methods which serve to both maintain optimum receiver performance while periodically cycling frequencies, and to coordinate switching of frequencies to recover from frequency interference. These methods of implementing control step 440 illustrated in FIG. 4 are discussed below with reference to the flow diagram of FIG. 5. The underlying principle driving this frequency control is the existence of "preferred", "primary", and "alternate" frequencies. The preferred frequency denotes the frequency preferred for steady state frequency operation. The primary frequency is the one that is in use or was last in use for tracking. The alternate frequency or frequencies is/are used either for periodic cycling to measure ionospheric delays or for coordinated switching to establish a frequency that can be tracked.

Determination of Steady State Operation

Figure 5:
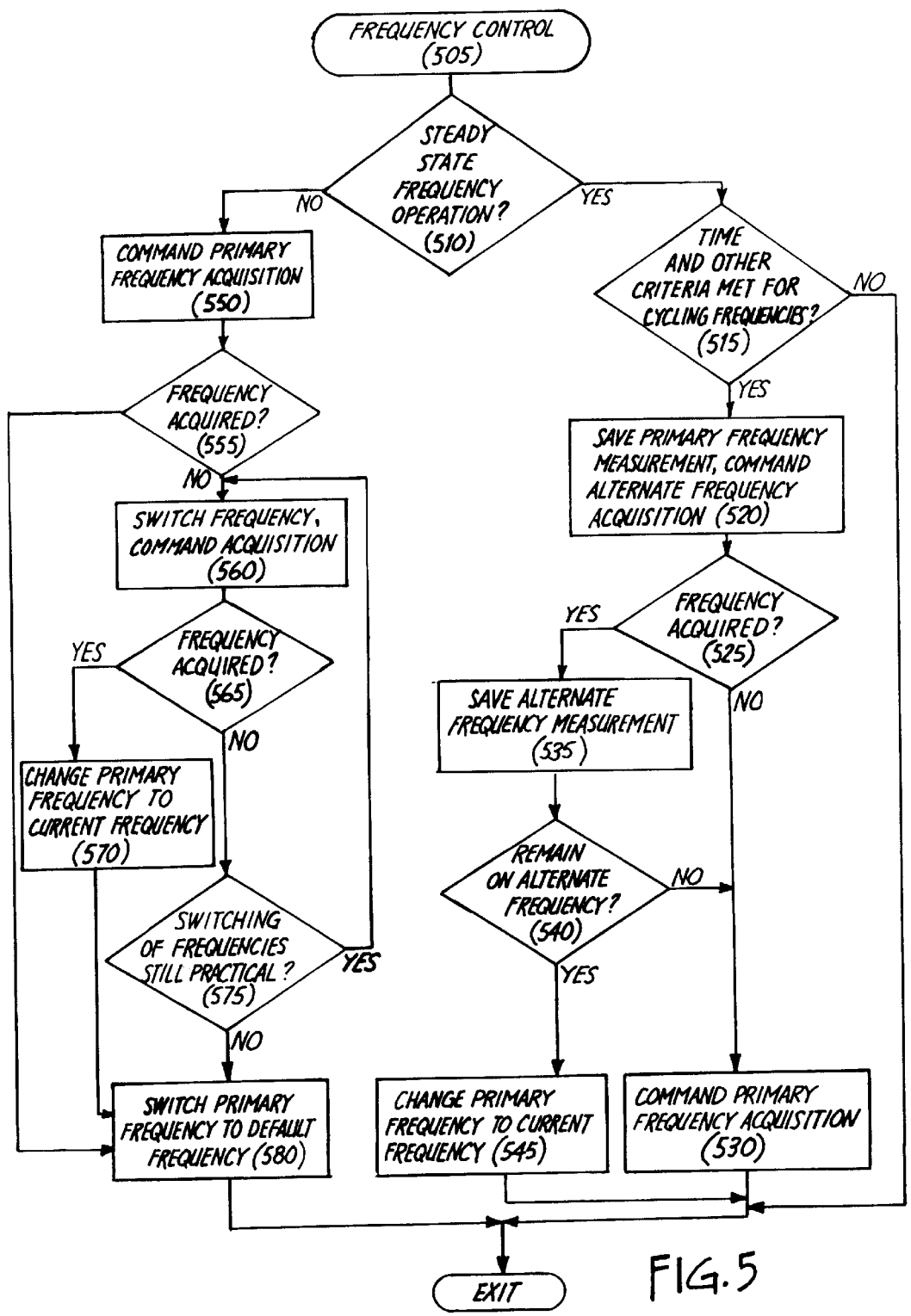
FIG. 5 is a block diagram illustrating in greater detail the methods of the present invention of operating the single frequency sequencing GPS receivers.

Referring to FIG. 5, frequency control (i.e., control of the RF switches illustrated in FIGS. 2 and 3) is designated as beginning at step 505. The frequency selection logic has two basic elements: periodic frequency cycling and coordinated frequency switching. As shown in block 510 of FIG. 5, an aspect of the invention is the determination of whether the receiver has achieved steady state frequency operation. An example steady state operation is the tracking of sufficient satellite signals to compute a position solution.

Periodic Frequency Cycling

If the receiver has achieved steady state operation, then periodic frequency cycling can be initiated as illustrated at 515 in FIG. 5. In steady state operation, the receiver performs periodic frequency cycling for two purposes. The primary purpose is to measure the ionospheric delay by comparing measurements from the different frequencies. The receiver cycles to the alternate frequency for a measurement and then returns to the primary frequency. The secondary purpose is to transition the receiver's primary frequency to an alternate frequency when that alternate frequency is tracked and matches the preferred frequency.

The timing of the periodic ionospheric measurement cycles is carefully selected to cause the least disturbance to satellite data collection. Using a standard GPS five subframe message data format, the ephemeris data is repeated in subframes 1, 2 and 3 every 30 seconds while the paged navigational data in subframes 4 and 5 only repeat every 12.5 minutes. The periodic ionospheric measurement timing is selected to occur after subframe 1 is completed and before subframe 4 begins. This allows the receiver to continually check the ephemeris health (subframe 1) and collect the paged navigational data without interruptions.

One possible embodiment of frequency cycling steps during steady state operation is illustrated in FIG. 5. If at step 515 the determination is made that it is a correct time for cycling frequencies and that all cycling criteria have been met, then at step 520, the primary frequency measurement is saved, and the microprocessor controls the frequency switch to command alternate frequency acquisition. If the alternate frequency is not acquired (step 525) due to signal interference or other reasons, at step 530 primary frequency acquisition is again commanded by the microprocessor. If the alternate frequency is successfully acquired, the alternate frequency measurement is saved at step 535.

After the alternate frequency ionospheric measurement is saved, at step 540 the determination is made whether to remain on the alternate frequency. If the decision is made to remain on the alternate frequency, for example because the alternate frequency matches the preferred frequency, then at step the primary frequency is changed to the current frequency. If the decision is made at step 540 to return to the primary frequency, then at step 530 the microprocessor controls the RF switch to command primary frequency acquisition.

Coordinated Frequency Switching For Achieving Steady State Operation

When the receiver is first transitioned to an operational state it must acquire satellite positioning signals before achieving its steady state frequency operation. In this case, at step 550, the microprocessor will control the RF switch and DSP to attempt acquisitions on its primary frequency. If at step 555 it is determined that steady state operation cannot be achieved on the preferred frequency, then at step 560 the microprocessor of the receiver controls the RF switch and DSP to perform a coordinated frequency switch to the alternate frequency. If at step 565 the alternate frequency is acquired, then at step 570 the primary frequency is set to the current acquired frequency, and steady state operation is achieved. If the alternate frequency is not acquired, then a coordinated frequency switch is performed until this is no longer viable. When the alternate frequency attempts have been exhausted and it is no longer viable to switch frequencies as determined at step 575, the receiver will revert to the default frequency as illustrated at step 580.

Coordinated Frequency Switching for Recovering Steady State Operation

The receiver can drop out of steady state frequency operation when it loses lock on the primary frequency due to jamming, obscuration, or other forms of interference. During this time, periodic cycles will be postponed until steady state frequency operation is achieved on either its primary or an alternate frequency. If steady state frequency operation was achieved on an alternate frequency and the preferred frequency was changed, the primary frequency will be restored as part of the periodic frequency cycling.

Although the present invention has been described with reference to preferred embodiments, workers skilled in the art will recognize that changes may be made in form and detail without departing from the spirit and scope of the invention. For example, while the present invention is described primarily with reference to the GPS and to the L1 and L2 signals, the invention can be used with other GNSS and/or other signal frequencies.

What is claimed is:

1. A method of tracking both first global positioning signals at a first frequency and second global positioning signals at a second frequency different than the first frequency using a global positioning system (GPS) receiver having an intermediate frequency or frequencies input to channels of a digital signal processor adapted to generate a navigation solution, the method comprising:

receiving both of the first global positioning signals and the second global positioning signals;

separating the first global positioning signals having the first frequency from the second global positioning signals having the second frequency;

translating the first global positioning signals having the first frequency and the second global positioning signals having the second frequency into first and second translated global positioning signals, respectively, having an intermediate frequency or frequencies different than the first and second frequencies; and controlling sequencing of the first and second translated global positioning signals to selectively provide the first and second translated global positioning signals one at a time to the channels of the digital signal processor for use in navigation solution determination, wherein translating the first and second global positioning signals and controlling the sequencing further includes coordinating power control of multiple RF translators and channel frequency switches used to translate and to selectively couple one at a time the first and second translated global positioning signals to the channels of the digital signal processor for use in navigation solution determination, thereby reducing the power consumption of the GPS receiver.

2. The method of claim 1, wherein receiving both of the first and second global positioning signals further includes receiving L1 global positioning signals as the first global positioning signals and receiving L2 global positioning signals as the second global positioning signals.

3. The method of claim 1, wherein controlling sequencing of the first and second translated global positioning signals further comprises selectively alternately coupling the first and second translated global positioning signals one at a time to the channels of the digital signal processor such that navigation solution determination by the digital signal processor is optimized.

4. The method of claim 3, wherein selectively alternately coupling the first and second translated global positioning signals one at a time to the channels of the digital signal processor further includes determining whether the receiver has achieved a steady state of operation in which a sufficient number of first global positioning signals are being tracked to allow determination of the navigation solution by the digital signal processor.

5. The method of claim 4, wherein if the receiver is determined to have achieved the steady state of operation, then periodically coupling the second translated global positioning signals to the channels of the digital signal processor for ionospheric delay measurement.

6. The method of claim 5, wherein periodically coupling the second translated global positioning signals to the channels of the digital signal processor further includes:

saving as a primary frequency measurement a measurement from the first translated global positioning signal;

commanding alternate frequency acquisition; and in response to the alternate frequency command, coupling the second translated global positioning signals to the channels of the digital signal processor.

7. The method of claim 6, wherein periodically coupling the second translated global positioning signals to the channels of the digital signal processor further includes:

determining whether the second translated global positioning signals have been acquired; and if it is determined that the second translated global positioning signals have not been acquired, then commanding primary frequency acquisition in response to the primary frequency command to couple the first translated global positioning signals to the channels of the digital signal processor.

8. The method of claim 7, wherein if it is determined that the second translated global positioning signals have been acquired, then further comprising saving an alternate frequency measurement from the second translated global positioning signals.

9. The method of claim 8, and further comprising:

determining whether the second translated global positioning signals corresponds to a preferred frequency;

if the second translated global positioning signals corresponds to the preferred frequency, then assigning the second translated global positioning signals primary frequency status and continue tracking the second translated global positioning signals; and if the second translated global positioning signals do not correspond to the preferred frequency, then after saving the alternate frequency measurement coupling the first translated global positioning signals to the channels of the digital signal processor.

10. The method of claim 4, and if the receiver is determined to not have achieved steady state operation, then further comprising:

determining whether the first translated global positioning signals have been acquired; and if the first translated global positioning signals have not been acquired, then coupling the second translated global positioning signals to the channels of the digital signal processor.

11. The method of claim 10, and if the second translated global positioning signals are acquired, then assigning the second translated global positioning signals primary frequency status and continue tracking the second translated global positioning signals.

12. A global positioning system (GPS) receiver comprising:

antenna means for receiving both of first global positioning signals at a first frequency and second global positioning signals at a second frequency different than the first frequency;

diplexer means for separating the first global positioning signals having the first frequency from the second global positioning signals having the second frequency;

first translating means for translating the first global positioning signals having the first frequency into first translated global positioning signals having an intermediate frequency different than the first frequency;

second translating means for translating the second global positioning signals having the second frequency into second translated global positioning signals having an intermediate frequency different than the second frequency; and control means for controlling sequencing of the first and second translated global positioning signals to selectively provide the first and second translated global positioning signals, one at a time by controlling power to the first and second translating means, to the channels of the digital signal processor for use in navigation solution determination.

* * * * *